United States Patent [19]

Jarret et al.

[11] Patent Number: 4,541,051
[45] Date of Patent: Sep. 10, 1985

[54] ELECTRONICALLY CONTROLLED LAND VEHICLE

[76] Inventors: Jean Jarret; Jacques Jarret, both of 133 avenue du Maréchal Foch, 78130 Les Mureaux, France

[21] Appl. No.: 596,579

[22] Filed: Apr. 5, 1984

Related U.S. Application Data

[63] Continuation of Ser. No. 283,158, Jul. 14, 1981, abandoned.

[30] Foreign Application Priority Data

Jul. 18, 1980 [FR] France ................... 80 15870

[51] Int. Cl.³ .................. G06F 15/50; B62D 11/04
[52] U.S. Cl. .................... 364/424; 180/6.28; 180/6.5; 364/174
[58] Field of Search ............... 364/424, 450, 167, 174; 180/6.28, 6.5

[56] References Cited

U.S. PATENT DOCUMENTS

| | | | |
|---|---|---|---|
| 3,646,414 | 2/1972 | Gurwicz | 180/6.5 X |
| 3,688,169 | 8/1972 | Yamaya et al. | 318/138 |
| 3,756,335 | 9/1973 | Eisele et al. | 180/6.28 |
| 3,848,166 | 11/1974 | Jamieson | 318/227 |
| 3,970,160 | 7/1976 | Nowick | 180/6.5 |
| 4,110,668 | 8/1978 | Gurwicz et al. | 180/6.5 X |
| 4,158,196 | 6/1979 | Crawford, Jr. | 180/6.5 X |
| 4,196,785 | 4/1980 | Downing | 180/6.28 |

FOREIGN PATENT DOCUMENTS 1240979 7/1971 United Kingdom .

*Primary Examiner*—Joseph Ruggiero
*Attorney, Agent, or Firm*—Young & Thompson

[57] ABSTRACT

An electronically controlled vehicle having at least one pair of wheels which are driven by respective electric motors and each subjected to independent driving action. A computer placed on board the vehicle and associated with a reference clock is connected on the one hand to a control unit for receiving course-changing and speed-changing instructions and on the other hand to wheel-position detectors. Orders for initiating power exchanges with the respective wheels are transmitted to wheel-motor control elements, thus imparting differential acceleration in accordance with the course-changing and speed-changing instructions.

7 Claims, 7 Drawing Figures

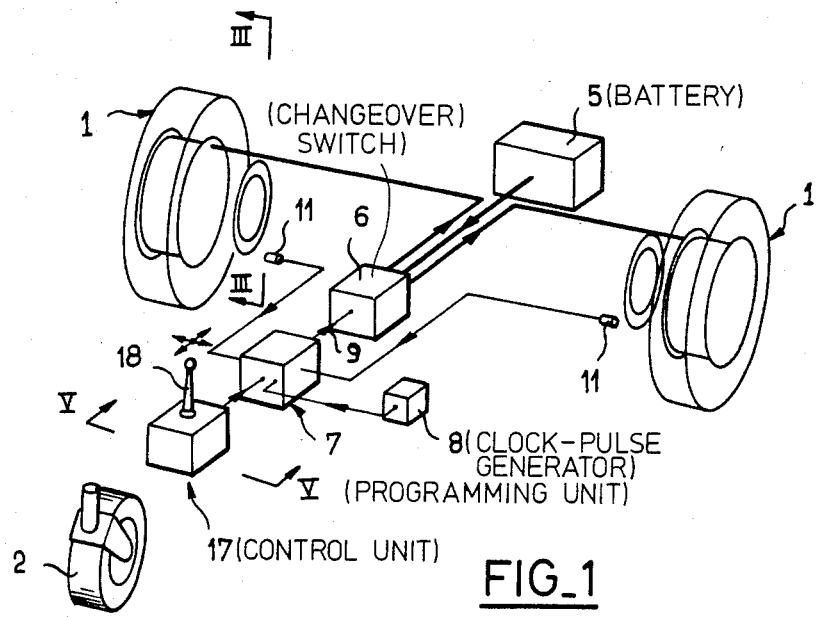
FIG_1
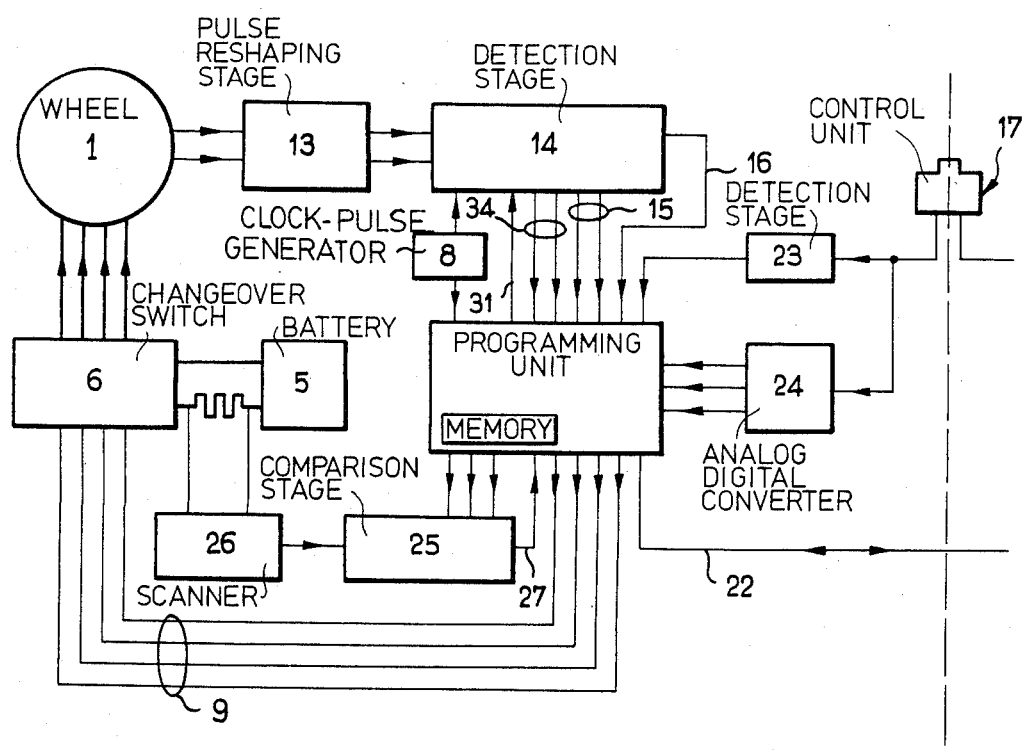
FIG_4

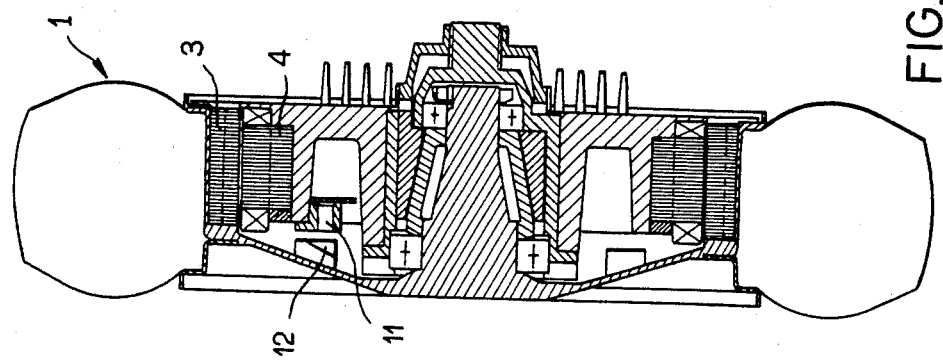
FIG_3
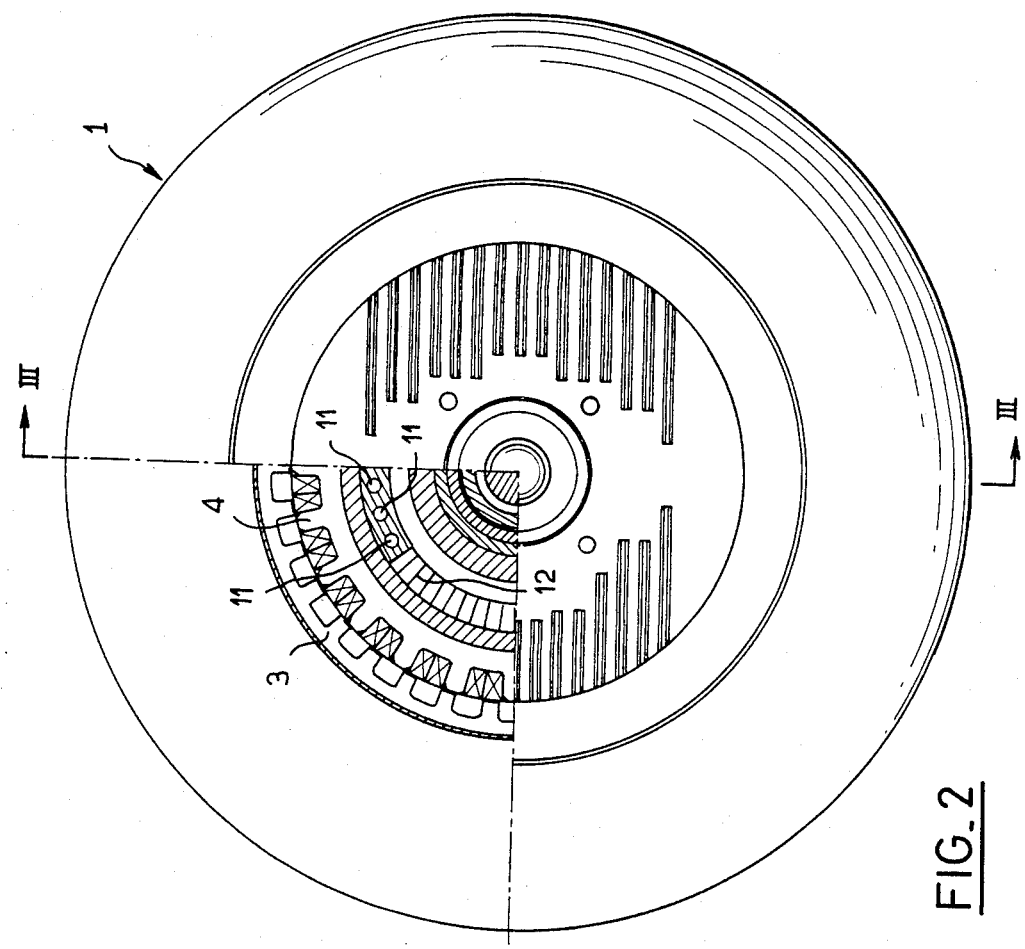
FIG_2

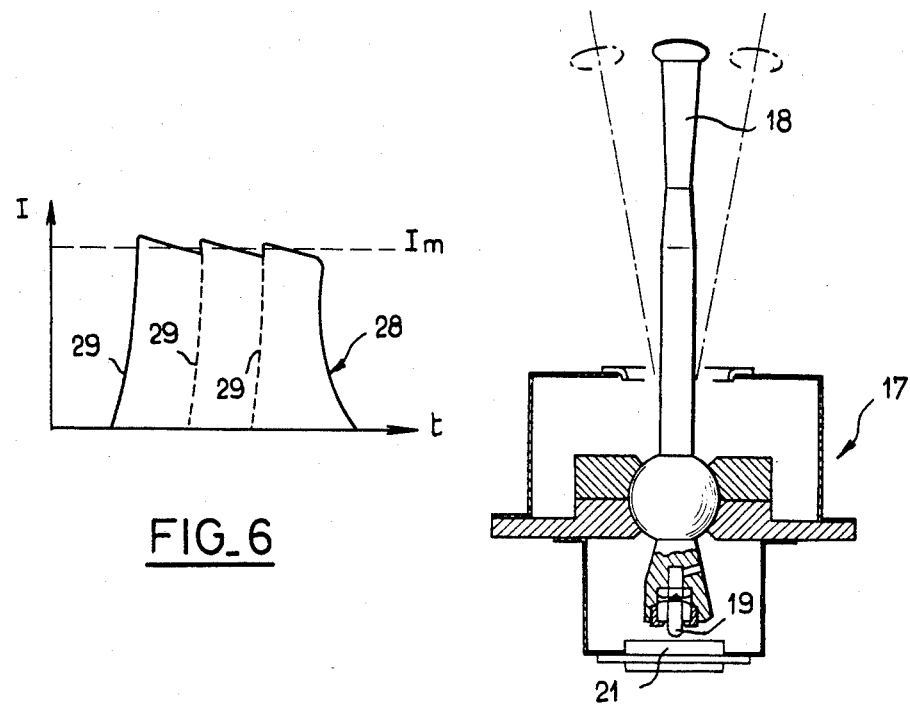
FIG_6
FIG_5
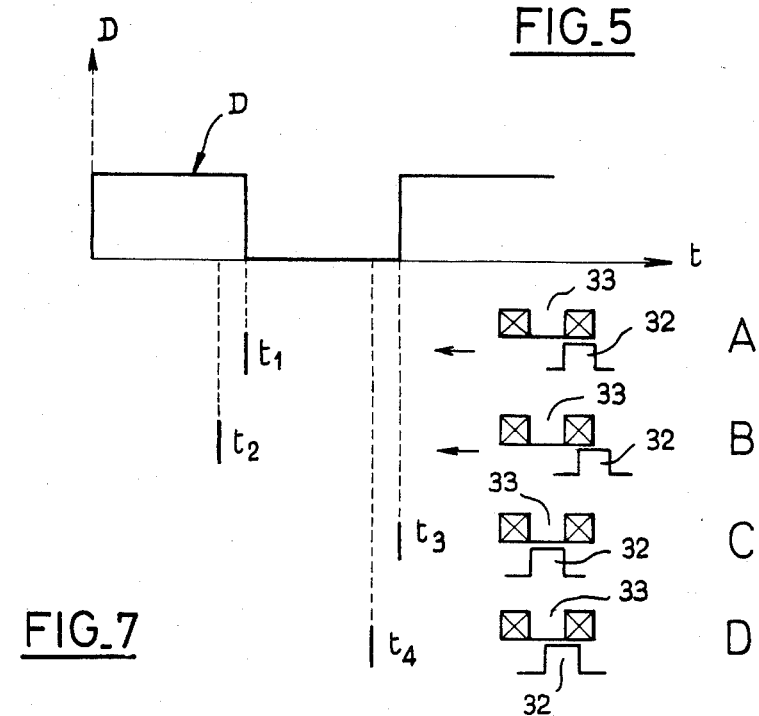
FIG_7

ELECTRONICALLY CONTROLLED LAND VEHICLE

This is a continuation of application Ser. No. 283,158, filed July 14, 1981, abandoned.

This invention relates to an electronically controlled land vehicle as well as to a method of control of said vehicle.

The land vehicles considered in the following specification are of the type comprising at least one pair of driving side-wheels, each of which can be subjected to independent driving action.

It is a known practice to guide land vehicles by independent adjustment of the positive or negative torque applied to the side wheels. To this end, each driving wheel is coupled to a variable-speed electric motor, the torque applied by said motor being adjusted by the driver who produces suitable action on a guiding member such as a hand lever. The driver is able at any moment to select the torque applied to each wheel, either in order to obtain the desired changes in direction of travel and speed of his vehicle or in order to maintain the vehicle on a given course, whether the course is straight or curved. Devices of this type and the mode of driving a vehicle which they entail are subject to various disadvantages since the driver is obliged to intervene personally by correcting any change of course arising from circumstances beyond his control. For example, any change in transverse slope or camber of a roadway produces a change in course which has to be corrected. Similarly, any obstacle encountered by a single wheel or any zone of lower adhesion produces the same effect. Furthermore, if the vehicle has one or two freely orientable wheels (such as the non-guided front wheel of a three-wheeled vehicle, for example), the position of said wheel or wheels is unknown to the driver and may interfere with the course of the vehicle. The correction to be made can only take place after the driver has noticed an unexpected deviation of his vehicle from its course. This effect is particularly marked during operations involving successive changes of direction. Corrective steps taken by the driver as a result of perception, thought and action have the effect of introducing a time-delay which is in no way conducive to accurate and reliable driving.

The present invention is directed to a novel design of vehicle which is unaffected by disturbances such as those mentioned in the foregoing, as well as to a method of control which is applicable to a vehicle of this type.

According to a first aspect of the invention, the electronically controlled land vehicle comprises at least one pair of side wheels driven by respective electronic motors, means for imparting an individual driving action to each wheel of said pair, and a source of electrical energy. The vehicle is essentially equipped with a computer associated with a reference clock and connected on the one hand to a control unit so as to receive course-changing and speed-changing instructions and on the other hand to devices for detecting the relative positions of the stationary and moving portions of the respective driving wheels, and finally elements for controlling the respective wheel motors in order to transmit to said elements orders for initiating an exchange of energy with the respective wheels in order to impart to said wheels a differential acceleration which is intended to ensure compliance with the course-changing and speed-changing instructions.

When no action is produced on the control unit, the computer actuates the vehicle wheels either in a symmetrical or in a differential manner in order to ensure compliance with a course and a speed corresponding to a prior instruction. This action has the effect of guarding against accidental deviations caused by various hazards without making it necessary for the driver to observe such deviations.

In a preferred embodiment of the invention, the computer comprises a number of programming units corresponding to the number of driving wheels and said units are connected to each other by means of connection lines for transfer of data between said units.

In an advantageous embodiment of the invention, the wheel motors are variable-reluctance motors each having a toothed rotor in cooperating relation with a toothed stator fitted with windings connected to a source of electrical energy via switching elements connected to the programming unit for transmitting pulses of predetermined intensity and duration to said windings.

In order to determine the intensity, the vehicle comprises a scanner for determining the intensity of each pulse delivered to the motor. Said scanner is connected to a stage for making a comparison with a reference value of the intensity produced by the computation stage.

The reference value of pulse intensity is determined by the computer as a function of the measured real speed and of the desired speed. As a function of the comparison of intensities, the computer modulates the pulse-chopping in order to make the real intensity equal to the reference intensity.

For the comparison of speeds, the vehicle is advantageously equipped in addition with a device for detecting the relative positions of the stationary and moving portions of each wheel; this stage is connected to the programming unit which determines the phase difference between a reference position of the motor and the start of the electrical pulse within the windings.

The computer adjusts said phase difference in order to define low-speed or high-speed operation, or a brake application adapted to either low speed or high speed.

According to a second aspect of the invention, the method of controlling a vehicle with a view in particular to ensuring that a vehicle having at least one pair of independent driving side-wheels negotiates a given curve, means being provided for imparting an individual driving action to each wheel, is distinguished by the fact that the vehicle is caused to make a turn by producing a predetermined difference in acceleration between the wheels of any one pair, the greatest acceleration being imparted to the wheel located on the outside of a road bend or curve. This difference is maintained until the radius of curvature of the path of travel of the vehicle corresponds to that of the circular portion of the curve to be negotiated, whereupon the accelerations imparted to the wheels are maintained until an increase is produced in the radius of curvature corresponding to the exit end of the curve.

Other features of the invention will be more apparent upon consideration of the following description and accompanying drawings, wherein:

FIG. 1 is an exploded schematic view in perspective showing a vehicle according to the invention;

FIG. 2 is a part-sectional side view of a wheel, this being taken along line II—II of FIG. 1;

FIG. 3 is a sectional view taken along line III—III of FIG. 2;

FIG. 4 is a diagram of the electrical connections of the vehicle;

FIG. 5 is a sectional view of the control unit, this view being taken along line V—V of FIG. 1;

FIG. 6 is a schematic representation of an electrical pulse;

FIG. 7 is a pulse waveform diagram which will serve to explain the operation of the invention.

Referring to FIG. 1, a vehicle is carried by a pair of driving wheels 1 and an orientable tricycle wheel 2. The vehicle wheels 1 are driving wheels and each comprise a toothed rotor 3 in cooperating relation with a stator 4 which is rigidly fixed to the vehicle (as shown in FIG. 2) and provided with windings in order to constitute a variable-reluctance synchronous motor. The number of stator commutations per wheel revolution is relatively high, namely a few tens to a few hundreds.

The windings of the stator 4 are connected to a battery 5 by means of a changeover switch 6 which, in the example herein described, is constituted by thyristors controlled from a programming unit 7 which is associated with a clock-pulse generator 8 by means of lines 9.

The vehicle wheels 1 are also equipped with detection elements consisting of a predetermined number of photoelectric cells 11 attached to the stator and adapted to cooperate with teeth 12 formed on the rotor (as shown in FIGS. 2 and 3) in order to detect the relative positions of the stator and of the rotor.

Said photoelectric cells are connected by means of a pulse-reshaping stage 13 (FIG. 4) to a detection stage 14 which measures the time intervals between the pulses emitted by the photoelectric cells and which also detects the direction of rotation of the wheel 1 by virtue of the fact that the number of photoelectric cells is greater than one.

These data relating to time intervals and direction of travel are transmitted to the programming unit 7 in digital form respectively via the lines 15 and 16.

A control unit 17 (shown in FIGS. 1 and 5) comprises a level 18 which can be inclined in all directions and the end of which is adapted to carry a lamp 19 so arranged as to illuminate an array 21 of photoelectric cells. It is apparent that the differential illumination of the photoelectric cells will be modified according to the direction of slope given to the lever 18 (forward, backward, to the left, to the right) and according to the angle of slope, and that the resultant signal will define both a direction of travel and an acceleration. The vehicle direction signal will correspond to different acceleration instruction signals transmitted respectively to the programming unit 7 and to a similar unit (not shown) which is connected to the other wheel in accordance with an arrangement similar to that of FIG. 4. A connection line 22 between said two units permits data transfer between these latter which are combined to form a computer.

The information relating to direction of travel arrives at the programming unit 7 via a detection stage 23 whilst the acceleration information passes through an analog-digital converter 24.

Starting from these data, the programming unit 7 determines a reference value of intensity of the pulses delivered to the stator and applies this value to a comparison stage 25 which compares said value to the real intensity measured by a scanner 26.

A connection line 27 serves to transmit the information relating to the result of said comparison to the programming unit 7. Depending on the direction of these results, the mode of operation of the thyristors is modified via the lines 9. It is in fact apparent that the mean intensity Im (FIG. 6) during a pulse 28 depends on the instants 29 of turn-on of the thyristors during said pulse.

The data relating to the instants of turn-on of the thyristors are transmitted to the detection stage 14 via a connection line 31, with the result that the stage 14 is enabled to determine the phase difference between the start of a pulse 28 and the instant at which the wheel passes through a reference position, said instant being defined by one of the photoelectric cells 11.

In more precise terms, the square-wave signal D (FIG. 7) emitted by the photoelectric cell is such that the leading edge of the pulse or rising amplitude of said pulse takes place when a tooth 32 of the rotor passes exactly in front of a tooth 33 of the stator (as shown in FIG. 7C).

The phase-difference information thus produced is transmitted to the programming unit 7 via a connection line 34. As a function of the instruction signals received from the control unit 17, the programming unit 7 modifies the phase difference in order to comply with this instruction.

Under conditions of low-speed forward travel, for example, the pulse is delivered at the instant $t_1$ when the tooth 32 of the rotor enters the zone of attraction of the stator (position A). At high speeds, triggering of the thyristors is advanced to a predetermined extent (position B) by turning-on at the instant $t_2$.

Low-speed braking action is obtained by turning-on at the instant $t_3$ when the tooth 32 is in position C in order to ensure that this latter is retained by attraction of the stator tooth 33. At high speeds, braking action will be produced by turning-on at the instant $t_4$, with a predetermined advance (position D).

In practice, the advances mentioned in the foregoing are produced in the form of a time-lag with respect to the leading edge of the signal D, for example by means of monostable devices.

The programming unit 7 further comprises a memory 35 having modifiable contents in which are stored a certain number of permanent instructions and especially safety instructions such as speed limits or a limiting radius of curvature of the vehicle path as a function of the speed.

During operation, the driver gives an instruction relating to a change in speed and direction of travel by means of the control unit 17, then returns this unit to the neutral position. From this instant, the programming unit 7 and the unit associated with the other wheel will ensure compliance with these instructions in spite of hazards on the path of the vehicle and without any need for intervention by the driver.

For example, if a change occurs in the slope of the roadway, the computer will modify the power transmitted to the vehicle wheels as soon as it records a tendency towards a variation in speed. The same applies to the course or direction of travel. If the instruction corresponds to a straight line, any incipient deviation caused for example by unevenness of the ground will result in unequal speeds of the wheels 1. This difference in speed recorded by the computer will produce a differential acceleration of the wheels which will tend to re-establish a straight course instantaneously.

The role of the driver is limited solely to that of modifying the reference values whenever he so desires.

In the case of a curved path of vehicle travel, the action which consists in tilting the operating level 18 has the effect of producing a differential acceleration of the vehicle wheels and consequently of producing a path of increasing curvature as long as the lever remains inclined. Once the lever has been restored to the neutral position, the radius of curvature of the path of travel remains constant. In order to return to a straight path, the operating lever must be tilted or inclined in the other direction in order to subject the vehicle wheels to a differential acceleration in the opposite direction which tends to reduce the curvature.

In an alternative embodiment, the control unit 17 can consist of a stationary handle which is responsive to the pressure exerted, by means of strain gages.

In the embodiment disclosed, the computer comprises following Motorola processors:
MC 6802 (central unit MPU)
MCM 2708 (EPROM memory)
MC 6821 (PIA interface circuit)
MC 6840 (timer).

The program which is stored in EPROM memory is listed in assembler language in the following pages.

```
PAGE   001      MOR9E

00001                              NAM    MOR9E    VITESSE STAB   20 5 81
00002              *
00003              *
00004              *
00005              *
00006              *
00007              *
00008              *
00009              *
00010                              OPT    0,5
00011 6000                         ORG    $6000
00012 6000 0F                      SEI
00013 6001 86 3A                   LDA A  #$3A
00014 6003 B7 1000                 STA A  $1000
00015 6006 86 A3                   LDA A  #$A3
00016 6008 B7 1001                 STA A  $1001
00017 600B 86 22                   LDA A  #$22
00018 600D B7 1000                 STA A  $1000
00019 6010 CE FFFF                 LDX    #$FFFF
00020 6013 FF 1004                 STX    $1004
00021 6016 DF 02                   STX    $02
00022 6018 86 FF                   LDA A  #$FF
00023 601A B7 0802                 STA A  $0802
00024 601D 97 0A                   STA A  $0A
00025 601F 97 0C                   STA A  $0C
00026 6021 97 0D                   STA A  $0D
00027 6023 86 04                   LDA A  #$04
00028 6025 B7 0801                 STA A  $0801
00029 6028 86 05                   LDA A  #$05
00030 602A B7 0803                 STA A  $0803
00031 602D B6 0800                 LDA A  $0800
00032 6030 B6 0802                 LDA A  $0802
00033 6033 86 83                   LDA A  #$83
00034 6035 97 16                   STA A  $16
00035 6037 97 20                   STA A  $20
00036 6039 CE 1000                 LDX    #$1000
00037 603C DF 00                   STX    $00
00038 603E 7F 0010                 CLR    $10
00039 6041 7F 0011                 CLR    $11
00040 6044 7F 0012                 CLR    $12
00041 6047 7F 0013                 CLR    $13
00042 604A 0E          PERI        CLI
00043 604B 96 0F                   LDA A  $0F
00044 604D 27 7E                   BEQ    SYN
00045 604F 96 0D                   LDA A  $0D
00046 6051 26 7A                   BNE    SYN
```

```
00047 6053 86 FF              LDA A   #$FF
00048 6055 97 0E              STA A   $0E
00049 6057 96 24              LDA A   $24
00050 6059 26 6F              BNE     BOUR
00051 605B 96 06              LDA A   $06
00052 605D D6 07              LDA B   $07
00053 605F 8B 02              ADD A   #$02
00054 6061 D0 12              SUB B   $12
00055 6063 24 02              BCC     COR1
00056 6065 80 01              SUB A   #$01
00057 6067 D0 12    COR1      SUB B   -$12
00058 6069 24 02              BCC     COR2
00059 606B 80 01              SUB A   #$01
00060 606D 97 36    COR2      STA A   $36
00061 606F D7 37              STA B   $37
00062 6071 7F 0040            CLR     $40
00063 6074 96 38              LDA A   $38
00064 6076 44                 LSR A
00065 6077 24 04              BCC     COR3
00066 6079 C6 F0              LDA B   #$F0
00067 607B D7 40              STA B   $40
00068 607D 97 39    COR3      STA A   $39
00069 607F 96 02              LDA A   $02
00070 6081 D6 03              LDA B   $03
00071 6083 9B 39              ADD A   $39
00072 6085 80 02              SUB A   #$02
00073 6087 01                 NOP
00074 6088 01                 NOP
00075 6089 DB 37              ADD B   $37
00076 608B 99 36              ADC A   $36
00077 608D 25 0E              BCS     AUG1
00078 608F DB 40              ADD B   $40
00079 6091 99 39              ADC A   $39
00080 6093 25 35              BCS     BOUR
00081 6095 DB 37              ADD B   $37
00082 6097 99 36              ADC A   $36
00083 6099 25 10              BCS     DIM1
00084 609B 20 2D              BRA     BOUR
00085 609D 96 13    AUG1      LDA A   $13
00086 609F 8B 08              ADD A   #$08
00087 60A1 25 27              BCS     BOUR
00088 60A3 97 13              STA A   $13
00089 60A5 84 E0              AND A   #$E0
00090 60A7 97 12              STA A   $12
00091 60A9 20 1F              BRA     BOUR
00092 60AB 96 13    DIM1      LDA A   $13
00093 60AD 81 20              CMP A   #$20
00094 60AF 25 19              BCS     BOUR
00095 60B1 D6 25              LDA B   $25
00096 60B3 DB 29              ADD B   $29
00097 60B5 D7 25              STA B   $25
00098 60B7 24 11              BCC     BOUR
00099 60B9 7F 0014            CLR     $14
00100 60BC 80 08              SUB A   #$08
00101 60BE 97 13              STA A   $13
00102 60C0 84 E0              AND A   #$E0
00103 60C2 80 20              SUB A   #$20
00104 60C4 25 04              BCS     BOUR
```

```
00105 60C6 8B 20        ADD  A  #$20
00106 60C8 97 12        STA  A  $12
00107 60CA 7E 6172 BOUR JMP     BOU
00108 60CD 7F 000F SYN  CLR     $0F
00109 60D0 86 FF        LDA  A  #$FF
00110 60D2 97 26        STA  A  $26
00111 60D4 86 0F        LDA  A  #$0F
00112 60D6 97 24        STA  A  $24
00113 60D8 96 11        LDA  A  $11
00114 60DA 91 13        CMP  A  $13
00115 60DC 27 14        BEQ     CONS
00116 60DE 24 0A        BCC     AUG
00117 60E0 96 13        LDA  A  $13
00118 60E2 27 0E        BEQ     CONS
00119 60E4 80 01        SUB  A  #$01
00120 60E6 97 13        STA  A  $13
00121 60E8 20 08        BRA     CONS
00122 60EA 96 13   AUG  LDA  A  $13
00123 60EC 8B 01        ADD  A  #$01
00124 60EE 25 02        BCS     CONS
00125 60F0 97 13        STA  A  $13
00126 60F2 96 13   CONS LDA  A  $13
00127 60F4 84 E0        AND  A  #$E0
00128 60F6 26 06        BNE     DIM
00129 60F8 D6 0D        LDA  B  $0D
00130 60FA 26 02        BNE     DIM
00131 60FC 86 20        LDA  A  #$20
00132 60FE 97 12   DIM  STA  A  $12
00133 6100 96 00        LDA  A  $00
00134 6102 43           COM  A
00135 6103 84 F0        AND  A  #$F0
00136 6105 8B 20        ADD  A  #$20
00137 6107 97 29        STA  A  $29
00138 6109 96 00        LDA  A  $00
00139 610B 43           COM  A
00140 610C D6 01        LDA  B  $01
00141 610E 53           COM  B
00142 610F 44           LSR  A
00143 6110 56           ROR  B
00144 6111 44           LSR  A
00145 6112 56           ROR  B
00146 6113 97 38        STA  A  $38
00147 6115 D7 07        STA  B  $07
00148 6117 D7 05        STA  B  $05
00149 6119 80 02        SUB  A  #$02
00150 611B 97 06        STA  A  $06
00151 611D 16           TAB
00152 611E 84 07        AND  A  #$07
00153 6120 8B 02        ADD  A  #$02
00154 6122 97 04        STA  A  $04
00155 6124 C4 F8        AND  B  #$F8
00156 6126 54           LSR  B
00157 6127 54           LSR  B
00158 6128 D7 0A        STA  B  $0A
00159 612A C4 F8        AND  B  #$F8
00160 612C 27 1B        BEQ     ADI
00161 612E 86 FF        LDA  A  #$FF
00162 6130 97 0D        STA  A  $0D
```

```
00163 6132 96 04         LDA  A  $04
00164 6134 80 02         SUB  A  #$02
00165 6136 97 08         STA  A  $08
00166 6138 96 05         LDA  A  $05
00167 613A 97 09         STA  A  $09
00168 613C 86 06         LDA  A  #$06
00169 613E 97 0B         STA  A  $0B
00170 6140 7F 000C       CLR     $0C
00171 6143 86 FF         LDA  A  #$FF
00172 6145 97 3C         STA  A  $3C
00173 6147 20 29         BRA     BOU
00174 6149 7F 000D  AD1  CLR     $0D
00175 614C 96 3C   AD2   LDA  A  $3C
00176 614E 26 16         BNE     BOUA
00177 6150 96 04         LDA  A  $04
00178 6152 D6 05         LDA  B  $05
00179 6154 DB 07         ADD  B  $07
00180 6156 99 06         ADC  A  $06
00181 6158 80 03         SUB  A  #$03
00182 615A DB 03         ADD  B  $03
00183 615C 99 02         ADC  A  $02
00184 615E 24 0B         BCC     AD3
00185 6160 8B 02         ADD  A  #$02
00186 6162 97 08         STA  A  $08
00187 6164 D7 09         STA  B  $09
00188 6166 7F 003C  BOUA CLR     $3C
00189 6169 20 07         BRA     BOU
00190 616B 86 02   AD3   LDA  A  #$02
00191 616D 97 08         STA  A  $08
00192 616F 7F 0009       CLR     $09
00193 6172 B6 0800  BOU  LDA  A  $0800
00194 6175 16            TAB
00195 6176 84 E0         AND  A  #$E0
00196 6178 97 27         STA  A  $27
00197 617A 91 11         CMP  A  $11
00198 617C 27 0E         BEQ     BOU8
00199 617E 96 28         LDA  A  $28
00200 6180 8B 01         ADD  A  #$01
00201 6182 97 28         STA  A  $28
00202 6184 24 09         BCC     BOU9
00203 6186 96 27         LDA  A  $27
00204 6188 97 11         STA  A  $11
00205 618A 20 03         BRA     BOU9
00206 618C 7F 0028  BOU8 CLR     $28
00207 618F 96 11   BOU9  LDA  A  $11
00208 6191 27 2E         BEQ     BOU2
00209 6193 91 13         CMP  A  $13
00210 6195 25 02         BCS     BOU1
00211 6197 20 28         BRA     BOU2
00212 6199 86 FF   BOU1  LDA  A  #$FF
00213 619B 97 0F         STA  A  $0F
00214 619D 96 26         LDA  A  $26
00215 619F 27 05         BEQ     BOU7
00216 61A1 7A 0026       DEC     $26
00217 61A4 20 0B         BRA     BOU6
00218 61A6 96 24   BOU7  LDA  A  $24
00219 61A8 27 13         BEQ     BOU5
00220 61AA 7A 0024       DEC     $24
00221 61AD 86 FF         LDA  A  #$FF
```

```
00222 61AF 97 26            STA A    $26
00223 61B1 96 12    BOU6    LDA A    $12
00224 61B3 81 E0            CMP A    #$E0
00225 61B5 27 06            BEQ      BOU5
00226 61B7 8B 20            ADD A    #$20
00227 61B9 97 13            STA A    $13
00228 61BB 97 12            STA A    $12
00229 61BD DE 04    BOU5    LDX      $04
00230 61BF DF 08            STX      $08
00231 61C1 C4 04    BOU2    AND B    #$04
00232 61C3 DB 2A            ADD B    $2A
00233 61C5 17              TBA
00234 61C6 CB E0            ADD B    #$E0
00235 61C8 D7 17            STA B    $17
00236 61CA 16              TAB
00237 61CB 54              LSR B
00238 61CC 1B              ABA
00239 61CD 84 04            AND A    #$04
00240 61CF 27 0F            BEQ      BOU3
00241 61D1 96 0F            LDA A    $0F
00242 61D3 27 0B            BEQ      BOU3
00243 61D5 86 20            LDA A    #$20
00244 61D7 97 11            STA A    $11
00245 61D9 97 12            STA A    $12
00246 61DB 97 13            STA A    $13
00247 61DD 7F 000F          CLR      $0F
00248 61E0 96 0E    BOU3    LDA A    $0E
00249 61E2 26 03            BNE      BOU4
00250 61E4 7E 604A          JMP      PERI
00251 61E7 0E      BOU4    CLI
00252 61E8 8E 0050          LDS      #$50
00253 61EB 20 85            BRA      BOU
00254 61ED FE 1006          LDX      $1006
00255 61F0 DF 00            STX      $00
00256 61F2 CE FFFF          LDX      #$FFFF
00257 61F5 FF 1006          STX      $1006
00258 61F8 7F 000E          CLR      $0E
00259 61FB B6 0800          LDA A    $0800
00260 61FE 84 01            AND A    #$01
00261 6200 26 05            BNE      ARRI
00262 6202 86 08            LDA A    #$08
00263 6204 97 2A            STA A    $2A
00264 6206 3B              RTI
00265 6207 7F 002A   ARRI   CLR      $2A
00266 620A 3B              RTI
00267 620B B6 0800   EXT    LDA A    $0800
00268 620E 84 10            AND A    #$10
00269 6210 27 1C            BEQ      ADE1
00270 6212 96 12            LDA A    $12
00271 6214 84 C0            AND A    #$C0
00272 6216 27 02            BEQ      EXT1
00273 6218 97 12            STA A    $12
00274 621A D6 12    EXT1    LDA B    $12
00275 621C 86 10            LDA A    #$10
00276 621E 1B              ABA
00277 621F B7 0802          STA A    $0802
00278 6222 F7 0802          STA B    $0802
00279 6225 B6 0800   ADE2   LDA A    $0800
```

```
00280 6228 84 10              AND A   #$10
00281 622A 27 02              BEQ     ADE1
00282 622C 20 F7              BRA     ADE2
00283 622E 39         ADE1    RTS
00284 622F 96 2F      ASC     LDA A   $2F
00285 6231 26 01              BNE     ASC1
00286 6233 39                 RTS
00287 6234 DE 20      ASC1    LDX     $20
00288 6236 A6 00              LDA A   X
00289 6238 D6 12              LDA B   $12
00290 623A 1B                 ABA
00291 623B B7 0802            STA A   $0802
00292 623E F7 0802            STA B   $0802
00293 6241 39                 RTS
00294 6242 B6 0802            LDA A   $0802
00295 6245 96 0D              LDA A   $0D
00296 6247 27 24              BEQ     AD4
00297 6249 96 12              LDA A   $12
00298 624B 26 0C              BNE     AD5
00299 624D CE 4F00            LDX     #$4F00
00300 6250 FF 1004            STX     $1004
00301 6253 7F 000E            CLR     $0E
00302 6256 8D C2              BSR     EXT1
00303 6258 3B                 RTI
00304 6259 CE 0400    AD5     LDX     #$0400
00305 625C FF 1004            STX     $1004
00306 625F B6 0800            LDA A   $0800
00307 6262 84 07              AND A   #$07
00308 6264 8B D0              ADD A   #$D0
00309 6266 97 21              STA A   $21
00310 6268 8D A1              BSR     EXT
00311 626A 8D C3              BSR     ASC
00312 626C 3B                 RTI
00313 626D 86 FF      AD4     LDA A   #$FF
00314 626F 97 2F              STA A   $2F
00315 6271 B6 0800            LDA A   $0800
00316 6274 84 08              AND A   #$08
00317 6276 44                 LSR A
00318 6277 44                 LSR A
00319 6278 44                 LSR A
00320 6279 D6 0B              LDA B   $0B
00321 627B DB 0C              ADD B   $0C
00322 627D CB 01              ADD B   #$01
00323 627F C4 01              AND B   #$01
00324 6281 11                 CBA
00325 6282 26 03              BNE     BON
00326 6284 7F 002F            CLR     $2F
00327 6287 96 10      BON     LDA A   $10
00328 6289 27 1C              BEQ     AD9
00329 628B FE 1006            LDX     $1006
00330 628E DF 02              STX     $02
00331 6290 96 0A              LDA A   $0A
00332 6292 27 0A              BEQ     AD41
00333 6294 9B 2D              ADD A   $2D
00334 6296 80 02              SUB A   #$02
00335 6298 26 04              BNE     AD41
00336 629A 86 02              LDA A   #$02
00337 629C 97 0B              STA A   $0B
```

```
00338 629E 7F 0010 AD41   CLR     $10
00339 62A1 DE 16          LDX     $16
00340 62A3 A6 00          LDA A   X
00341 62A5 97 21          STA A   $21
00342 62A7 96 0B    AD9   LDA A   $0B
00343 62A9 27 10          BEQ     AD6
00344 62AB CE 0390 AD7    LDX     #$0390
00345 62AE FF 1004        STX     $1004
00346 62B1 BD 620B        JSR     EXT
00347 62B4 BD 622F        JSR     ASC
00348 62B7 7A 000B        DEC     $0B
00349 62BA 3B             RTI
00350 62BB 96 0C    AD6   LDA A   $0C
00351 62BD 27 0E          BEQ     AD8
00352 62BF DE 04          LDX     $04
00353 62C1 FF 1004        STX     $1004
00354 62C4 BD 620B        JSR     EXT
00355 62C7 8D 2A          BSR     AAC
00356 62C9 7A 000C        DEC     $0C
00357 62CC 3B             RTI
00358 62CD DE 08    AD8   LDX     $08
00359 62CF 96 2D          LDA A   $2D
00360 62D1 9B 0A          ADD A   $0A
00361 62D3 80 02          SUB A   #$02
00362 62D5 26 07          BNE     AD81
00363 62D7 96 0A          LDA A   $0A
00364 62D9 26 03          BNE     AD81
00365 62DB CE 01B0        LDX     #$01B0
00366 62DE FF 1004 AD81   STX     $1004
00367 62E1 96 0A          LDA A   $0A
00368 62E3 97 2D          STA A   $2D
00369 62E5 86 FF          LDA A   #$FF
00370 62E7 97 10          STA A   $10
00371 62E9 86 03          LDA A   #$03
00372 62EB 97 0C          STA A   $0C
00373 62ED BD 620B        JSR     EXT
00374 62F0 8D 01          BSR     AAC
00375 62F2 3B             RTI
00376 62F3 96 2F    AAC   LDA A   $2F
00377 62F5 27 0D          BEQ     AAC1
00378 62F7 DE 20          LDX     $20
00379 62F9 A6 00          LDA A   X
00380 62FB D6 12          LDA B   $12
00381 62FD 1B             ABA
00382 62FE B7 0802        STA A   $0802
00383 6301 F7 0802        STA B   $0802
00384 6304 96 0A    AAC1  LDA A   $0A
00385 6306 97 0B          STA A   $0B
00386 6308 96 2A          LDA A   $2A
00387 630A 27 0C          BEQ     ADA1
00388 630C 96 21          LDA A   $21
00389 630E 16             TAB
00390 630F C4 FC          AND B   #$FC
00391 6311 4C             INC A
00392 6312 84 03          AND A   #$03
00393 6314 1B             ABA
00394 6315 97 21          STA A   $21
00395 6317 39             RTS
```

```
00396 6318 96 21    ADA1    LDA A  $21
00397 631A 16               TAB
00398 631B C4 FC            AND B  #$FC
00399 631D 4A               DEC A
00400 631E 84 03             AND A  #$03
00401 6320 1B               ABA
00402 6321 97 21            STA A  $21
00403 6323 39               RTS
00404      0000             END
PERI   604A COR1   6067 COR2   606D COR3   607D AUG1   609D
DIM1   60AB BOUR   60CA SYN    60CD AUG    60EA CONS   60F2
DIM    60FE AD1    6149 AD2    614C BOUA   6166 AD3    616B
BOU    6172 BOU8   618C BOU9   618F BOU1   6199 BOU7   61A6
BOU6   61B1 BOU5   61BD BOU2   61C1 BOU3   61E0 BOU4   61E7
ARR1   6207 EXT    620B EXT1   621A ADE2   6225 ADE1   622E
ASC    622F ASC1   6234 AD5    6259 AD4    626D BON    6287
AD41   629E AD9    62A7 AD7    62AB AD6    62BB AD8    62CD
AD81   62DE AAC    62F3 AAC1   6304 ADA1   6318
```

*TOTAL ERRORS 00000*

What is claimed is:

1. An electronically controlled land vehicle, comprising at least one pair of side wheels driven by respective electric motors, a source of electrical energy for said electric motors, and a digital computer connected to a reference-clock, said computer having first input means connected to a control unit adapted to provide acceleration instructions for each of said wheels, second input means connected to devices for detecting the relative positions of the stationary and moving portions of the respective driving wheels, and output means connected to input means of elements for controlling the energy supply to the respective electric motors, the computer being adapted to provide on the output means signals responsive to the detection of said relative positions which are a representation of the energy necessary in each driving wheel for having the vehicle comply with the acceleration instructions.

2. A vehicle according to claim 1, wherein the computer comprises a number of programming units corresponding to the number of driving wheels, said units being connected to each other by means of connection lines for transfer of data between said units.

3. A vehicle according to claim 2, wherein the wheel motors are variable-reluctance motors each having a toothed rotor in cooperating relation with a toothed stator fitted with windings connected to a source of electrical energy via switching elements connected to the programming unit for transmitting pulses of predetermined intensity and duration to said windings.

4. A vehicle according to claim 3, wherein said vehicle comprises a scanner for determining the intensity of each pulse delivered to the motor, said scanner being connected to a stage for making a comparison with a reference value of the intensity produced by the computation stage.

5. A vehicle according to claim 3 or claim 4, wherein the devices for detecting the relative positions of the stationary and moving portions of each wheel are connected to the programming unit which determines the phase difference between a reference position of the motor and the start of the electrical pulse within the windings.

6. A vehicle according to claim 5, wherein the device for detecting the relative positions of a wheel comprises a predetermined number of photoelectric cells attached to the stator and adapted to cooperate with teeth of the rotor.

7. A vehicle according to claim 1, wherein the computer comprises memory stages for the storage of data corresponding to permanent instructions.

* * * * *